Feb. 24, 1959  E. S. GANDRUD  2,874,879
MACHINE FOR SPREADING GRANULAR MATERIAL AND
MEANS FOR ADJUSTING THE HEIGHT THEREOF
Filed April 5, 1957
2 Sheets-Sheet 1
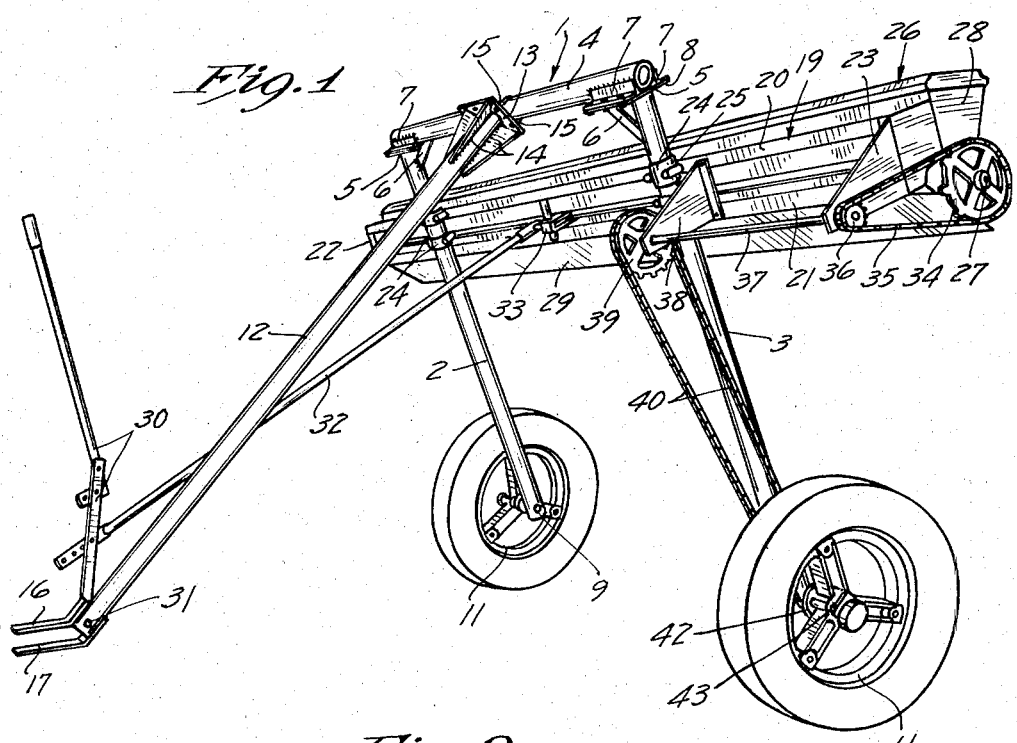
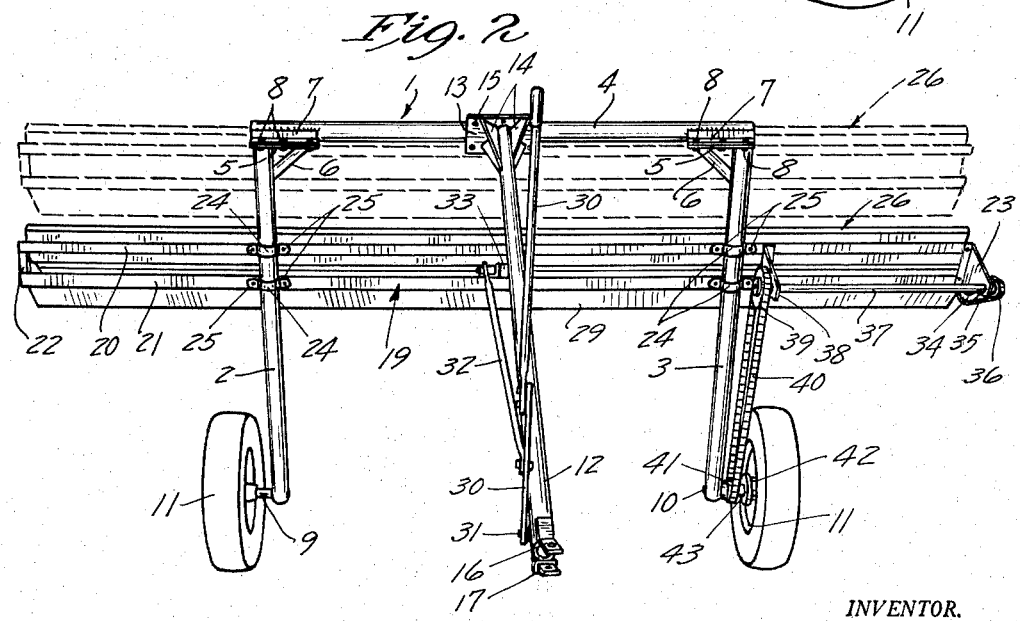
INVENTOR.
Ebenhard S. Gandrud
BY
Merchant & Merchant
ATTORNEYS Feb. 24, 1959   E. S. GANDRUD   2,874,879
MACHINE FOR SPREADING GRANULAR MATERIAL AND
MEANS FOR ADJUSTING THE HEIGHT THEREOF
Filed April 5, 1957
2 Sheets-Sheet 2
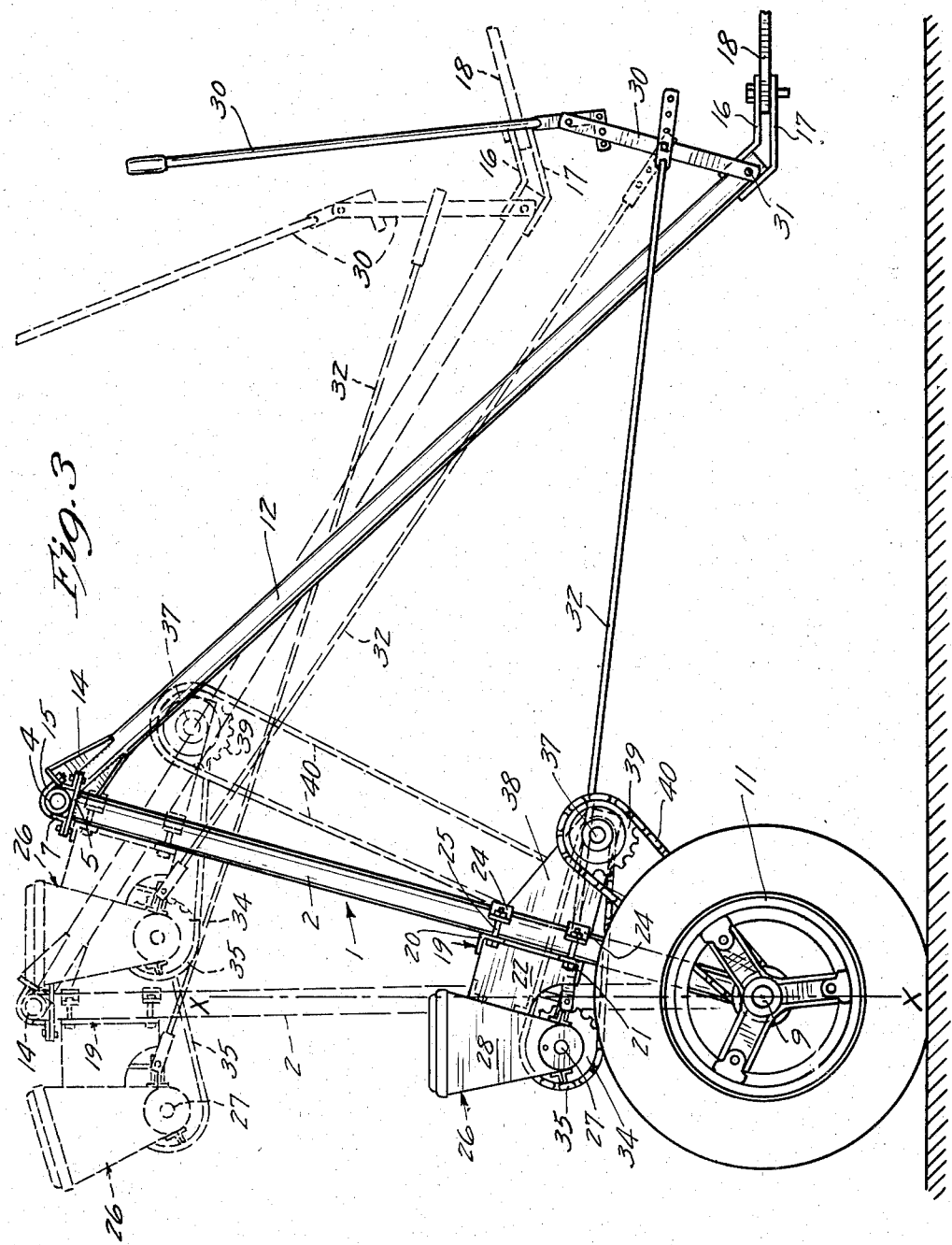
INVENTOR.
Ebenhard S. Gandrud
BY
Merchant & Merchant
ATTORNEYS

United States Patent Office 2,874,879
Patented Feb. 24, 1959

2,874,879

MACHINE FOR SPREADING GRANULAR MATERIAL AND MEANS FOR ADJUSTING THE HEIGHT THEREOF

Ebenhard S. Gandrud, Owatonna, Minn.

Application April 5, 1957, Serial No. 650,899

4 Claims. (Cl. 222—177)

My invention relates generally to agricultural machinery, and more particularly to machines for the spreading of granular material such as fertilizer, or dry insecticide and the like to a field of growing crops.

An important object of my invention is the provision of a device as set forth, having a dispensing hopper which can be quickly and easily adjusted as to elevation so as to closely overlie the tops of the crops to be treated, so that discharge of material from the hopper is substantially unaffected by wind and is accurately delivered to the desired point of delivery.

Another object of my invention is the provision of a machine for dispensing powdered or granular material, which is adapted for use in fields of row crops, and can be moved through such fields between rows of plants without disturbing the same.

Another object of my invention is the provision of a machine having a dispensing hopper as set forth, which, when lowered in elevation is adapted for use in sowing seed or dispensing insecticides or the like to the ground or low growing vegetation, and when raised to higher elevations is useful in applying insecticides in granular or powdered form to the top portions of taller plants.

Another object of my invention is the provision of a machine as set forth having wheel mounted laterally spaced parallel legs which support an elongated dispensing hopped for upward and downward movements thereon, said legs being inclined forwardly with respect to the direction of travel of the machine, whereby the center of gravity of the legs and hopper is disposed forwardly of the axis of said wheels in all positions of said hopper on said legs.

Still another object of my invention is the provision of a machine of the above type which is relatively simple and inexpensive to manufacture, which is efficient in operation, and which is relatively light in weight but rugged in construction and durable in use.

The above, and still further highly important objects and advantages of my invention will become apparent from the following detailed specification, appended claims and attached drawings.

Referring to the drawings, which illustrate the invention, and in which like reference characters indicate like parts throughout the several views;

Fig. 1 is a view in perspective of a machine built in accordance with my invention;

Fig. 2 is a perspective view as seen substantially directly from the front thereof, some parts thereof being positioned differently from the positions thereof in Fig. 1; and Fig. 3 is a view in side elevation.

Referring with greater detail to the drawings, the numeral 1 indicates in its entirety an inverted generally U-shaped frame comprising a pair of laterally spaced parallel forwardly and upwardly inclined legs 2 and 3 and a horizontally disposed cross bar 4. Welded or otherwise rigidly secured to the upper ends of the legs 2 and 3 are mounting plates 5 and relatively short diagonal brace members 6. The cross bar 4 is provided at its opposite ends with mounting flanges 7 which are welded to the cross bar 4, and which are rigidly secured to the plates 5 by nut-equipped machine screws or the like 8. A pair of axially aligned stub shafts 9 and 10 are rigidly mounted in the lower end portions of the legs 2 and 3 respectively, and project laterally outwardly therefrom, each having journalled thereon one of a pair of pneumatic tire equipped ground engaging wheels 11. The cross bar 4 is of a length to cause the legs 2 and 3 to be laterally spaced apart a distance substantially equal to the normal spacing between rows in row crops, or multiples of said distance, so that during passage of the machine through a field of row crops, each of the wheel-equipped legs 2 and 3 will travel longitudinally between a different pair of said rows.

Means for coupling the frame 1 to a pulling means such as a row crop tractor or the like comprises an elongated, rearwardly and upwardly inclined tubular tongue 12 having a transverse mounting plate 13 welded or otherwise secured to its upper rear end and braced by gusset plates or the like 14 welded to the plate 13 and upper end portion of the tongue 12. The plate 13 is bolted or otherwise rigidly secured to a pair of central mounting angles or flanges 15 that are welded to the cross bar 4 intermediate the opposite ends thereof. A pair of vertically spaced angular hitch bars 16 and 17 are rigidly anchored at their rear ends to the lower forward end of the tongue 12 and are adapted to be releasably secured to the conventional draw bar hitch of a tractor or the like indicated at 18 in Fig. 3.

Mounted on the legs 2 and 3 of the frame 1 is an elongated mounting beam 19 comprising upper and lower beam members 20 and 21 respectively connected at one end by a relatively short cross member 22 and at their other ends by a bearing bracket 23. It will be noted that the mounting beam 19 extends transversely of the legs 2 and 3, the opposite end portions of the beam 19 extending laterally outwardly beyond their respective legs, preferably a distance to overlie a single row of crops laterally outwardly of each of the legs 2 and 3. It should be here noted that the tongue 12, at its lower end portion, is adapted to pass between a pair of rows of plants intermediate the legs 2 and 3. In the embodiment of the invention illustrated, the beam 19 is of a length to overlie four rows of row crops such as corn, two of said rows being disposed between the legs 2 and 3, and one each of said rows underlying the outer end portions of the beam 19. It should be further noted that the legs 2 and 3 are preferably made from tubular metal such as steel or the like, whereby to be highly resistant against bending.

Each of the beam members 20 and 21 are provided with a pair of clamping bands or the like 24 which partially encompass their respective legs 2 and 3, and which are provided with clamping bolts or screws 25 which are screw threaded into their respective beam members 20 and 21. Loosening of the clamping screws or bolts 25 permits the clamping bands 24 and beam 19 to be slidably moved upwardly or downwardly on the legs 2 and 3 so that the beam may be located at any desired elevation between the limits of movement of the beam 19. When the beam is disposed in a desired set position, the clamping bolts 25 are tightened to frictionally lock the beam 19 against movement relative to the legs 2 and 3.

Extending longitudinally of the beam 19, and rigidly secured thereto at its opposite end portions, is an elongated dispensing hopper 26 of the type generally disclosed in my prior United States Letters Patent 2,350,107, issued May 30, 1944; 2,630,945, issued March 10, 1953;

and 2,723,053, issued November 8, 1955. As therein shown, the dispensing hoppers are provided with cross sectionally arcuate bottom portions having discharge apertures therein and means for metering flow of granular or powdered material therethrough. Additionally, these dispensing hoppers are provided with longitudinally extending rotary agitators or feeder bars having extended shaft portions which project outwardly through opposite end walls of the dispensing hoppers. Like those of the above mentioned patents, the hopper 26 is provided with a perforate bottom wall portion and valve means for regulating flow of material therethrough, together with a rotary agitator, not shown, which terminates at one end in an axially extended shaft portion 27 that projects outwardly of the adjacent end wall 28 of the hopper 26. The hopper 26 is provided with a longitudinally extending, rearwardly and downwardly sloping apron 29. Granular material falling downwardly through the discharge openings in the bottom of the hopper 26 strikes the top surface of the apron 29 and falls therefrom to the vegetation underlying the hopper as the machine passes through a field of row crops. The rate of discharge of material from the hopper 26 is controlled by linkage including a handle lever 30 pivotally secured at its lower end to the lower front end portion of the tongue 12, as indicated at 31, and an elongated rigid link 32 pivotally secured at one end to the handle lever 30 and at its opposite end to a bell crank 33 suitably mounted on the supporting beam 19. The bell crank 33 is connected to the feed rate control means of the hopper 26 in a manner not shown, but which may be assumed to be identical to that disclosed in my prior patents above identified.

Rotary movement is imparted to the agitator shaft 27 from the ground engaging wheel 11 journaled on the shaft 10 by power transmission mechanism now to be described. A sprocket wheel 34 is rigidly secured to the extended end of the shaft 27 and has running thereover an endless link chain 35 which is entrained over a second sprocket wheel 36 rigidly secured to one end of a jack shaft 37. The jack shaft 37 is journaled adjacent the sprocket wheel 36 in the bearing bracket 23, and adjacent its other end in a similar bearing bracket 38 bolted or otherwise secured to the beam members 20 and 21 in closely spaced relation to the frame leg 3. A sprocket wheel 39 is rigidly secured to the end portion of the jack shaft 37 adjacent the bearing bracket 38 and has running thereover an endless link chain 40 which also runs over a driving sprocket wheel 41 that is journaled on the stub shaft 10 between the leg 3 and its respective wheel 11. The sprocket wheel 41 is provided with a perforate disc-like element 42 that is adapted to receive the inner end of a drive pin or the like 43 that is mounted in the adjacent wheel 11 for axial sliding movements toward and away from the disc-like element 42. Engagement of the drive pin 43 with one of the perforations in the disc-like element 42 causes the element 42 and sprocket wheel 41 to rotate in common with the adjacent wheel 11 when the machine is moved over the ground. Obviously this rotary movement is transferred to the agitator shaft 27 through the chains 40 and 35, the jack shaft 37 and the sprocket wheels operatively associated therewith. This engagement of the drive pin 43 from the disc-like element 42 will permit the wheels 11 to rotate without causing such rotary movement to be imparted to the agitator shaft 27, so that no feeding movement of material from the hopper 26 will occur when not desired, such as when the machine is being moved from one field to another. The drive chain 40 is preferably of the type commonly known as the open link or ladder type chain any number of the links of which may be quickly and easily removed or replaced to shorten or lengthen the chain as desired. Obviously, when beam 19 and hopper 26 carried thereby are lowered from their position of Fig. 1, the chain 40 must be shortened accordingly so that sufficient tension is always applied to the chain 40 to prevent the same from slipping over the teeth of either sprocket 41 or sprocket 39. Similarly, when the beam 19 and hopper 26 are removed to their upper limit of movement with respect to the frame 1, the drive chain 40 is lengthened accordingly.

A highly advantageous feature of my improved machine resides in the forward and upward inclination of the supporting legs 2 and 3. Inasmuch as the machine trails behind a tractor or the like, in operation, it is important that the weight distribution of the machine be such that the center of gravity of the machine is located forwardly of the common axis of the wheels 11 or toward the front end of the tongue 12, so that an appreciable downward pressure is applied to the draw bar hitch 18 of the tractor with the dispensing hopper 26 and mounting base 19 therefor disposed in any given position on the legs 2 and 3 between the limits of adjustment thereof on said legs. I have found that, with the legs 2 and 3 inclining upwardly and forwardly at an angle of approximately 15° from a vertical plane indicated by the broken line $x$—$x$ (see Fig. 3) intersecting the common axis of the wheels 11, when the hitch bars 16 and 17 are disposed at the normal height of a draw bar hitch, the above mentioned downward pressure of the hitch bars applied to the draw bar hitch is sufficient to cause the machine to track properly behind the towing vehicle. Moreover, this downward pressure is sufficiently light to enable the user to lift the front end of the tongue 12 from the ground and attach the same to the draw bar hitch without undue exertion. The particular balance obtained by the above mentioned amount of forward inclination of the legs, and the relatively light weight of the entire structure permits a single person to manually support the front end of the tongue 12 and to move the entire machine over the ground with relative ease, with the dispensing hopper disposed at any given height on the legs 2 and 3. With the 15° forward and upward inclination of the legs, raising of the front end of the tongue 12 to a height of approximately five feet from the ground or its equivalent in angular movement about the axis of the wheels 11, causes the machine to arrive at a state of balance over the common wheel axis. Thus, in normal handling of the machine when placing the same behind a tractor and attaching the same to the tractor, or when manually moving the machine to a place of storage, there is no danger of tilting the same rearwardly to a point where loss of complete control occurs. Obviously, a machine as above described can be produced having the legs thereof inclining forwardly and upwardly at any desired angle greater than 15° from the vertical. However, I have found that, to produce a machine of a given height, the length of the legs 2 and 3 increases as the angle of slope from the vertical increases. By inclining the legs 2 and 3 forwardly and upwardly at said 15°, I achieve a strong rigid structure having its center of gravity at the most favorable location relative to the wheel axis with the dispensing hopper in any given position and by using a minimum of structure material. Obviously, the angle of forward and upward inclination of the legs 2 and 3 from the vertical line $x$—$x$ may be varied within limits without materially affecting the trailing characteristics of the machine. I have found that the above mentioned angle of forward and upward inclination of the legs may, if desired, be reduced to a minimum of 10° from said vertical line $x$—$x$. However, if a lesser angle than this minimum is used, insufficient downward pressure is applied to the draw bar hitch of the tractor to achieve good trailing of the machine, and the front end of the tongue 12 cannot be raised to an elevation wherein the machine can be conveniently handled. Thus, the likelihood of rearward tipping thereof is increased when the machine is disconnected from the tractor and manually moved, inasmuch as the wheels tend to move forwardly when the machine is over-balanced rearwardly of the vertical line x—x. If such a condition occurs when the fully loaded hopper is at or near its upper limit of adjustment on the legs, the machine becomes almost unmanageable and danger of injury to the operator results.

Although as above indicated, the present machine is adapted for use in the broadcast planting of seed, it is particularly important in the distribution of materials, such as insecticide and the like in granular or powdered form to plants in row crops for the destruction of insects which are harmful to crops, such as weevils, corn borers, army worms, wire worms or the like. I have found the instant machine to be particularly effective in combating the corn borer, the eggs of which are usually laid on the undersides of the leaves of the corn plant. Upon hatching, the corn borer crawls from the underside of the leaf and bores into the corn stalk at the point where the leaf joins the stalk. At this point, the stalk and leaf cooperate to define an upwardly opening funnel-like cup which has been found to normally contain a small amount of water, as a result of dew or rain. In use, the hopper 26 is filled with a suitable insecticide in granular or coarsely powdered form, the height of the beam 19 and hopper 26 adjusted so that the apron 29 will closely overlie the tops of the growing plants, the drive pin 43 being caused to engage the disc-like element 42 to impart rotary movements to the agitator shaft 27 and the machine caused to be moved through the field. Upon initiation of the operative movements of the machine through the field, the handle lever 30 will be positioned to cause the material to be discharged from the hopper 26 at the desired rate. The granular material, as it is discharged from the hopper 26, strikes the top surface of the apron 29 and rolls therefrom to the top surfaces of the underlying leaves of corn. The granules roll downwardly on the leaves and become deposited in the moisture contained in the cups defined by the inner ends of the corn leaves and the stalk. The insecticide may be one of any number on the market, such insecticides generally containing D. D. T. (dichloro-diphenyl-trichloroethane), and which, when dissolved in water, has been found to be highly efficient in the killing of various insects. As the corn borer bores into the lower end of the leaf at the junction thereof with the stalk, it comes in contact with the water within the cup and in which the insecticide has dissolved, and is destroyed thereby. I have found that with this method of distributing insecticide to growing corn in advance of the hatching period of the corn borer, that the dissolved insecticide in the cup-like portions of the corn plant is effective to kill corn borers even after several weeks have elapsed between application of the insecticide and corn borer hatching and activity. Furthermore, the above-described application of granular insecticide to the plant reduces to a considerable degree the detrimental effects of the residue of D. D. T., inasmuch as the entire leaf is not covered by insecticide as is the case when the insecticide is applied in liquid form by spraying or dusting the entire plant. The larger percentage of the granules of insecticide rolls into the above-mentioned funnel-like cup, the balance thereof falling to the ground.

While I have described the operation of my novel machine in connection with the application of insecticide to corn plants for elimination of the corn borer, it should be obvious that my device is equally useful in treating other row crops in much the same manner. Moreover, the device of the instant invention has been found to operate very efficiently, when the hopper 26 is moved to its lowermost position, in sowing of various seed such as alfalfa, timothy, clover, and various grasses.

While I have shown and described a commercial embodiment of my novel spreading machine, it will be understood that the same is capable of modification without departure from the spirit and scope of the invention as defined in the claims.

What I claim is:
1. In a machine for applying granular material to row crops, an inverted generally U-shaped frame comprising a pair of parallel legs and a cross bar rigidly connecting the upper ends of said legs, ground engaging wheels journalled to the lower end portions of said legs on a common axis, said legs being spaced apart for passage thereof between different rows of a row crop, a tongue rigidly anchored at one end to the intermediate portion of said cross bar and extending generally forwardly and downwardly with respect to the normal direction of movement of the machine, the front end of said tongue being normally disposed at the level of a tractor draw bar hitch and having a portion for connection to said hitch, an elongated dispensing hopper extending transversely of the machine, said dispensing hopper being of the type comprising a rotary agitator and having a rotary agitator shaft extending outwardly from one end thereof, means for mounting said hopper on said legs for upward and downward shifting movement of said hopper in a plane parallel to the legs and between the upper and lower end portions of said legs and for releasably locking said hopper in desired set positions between the limits of said shifting movement, said legs and the plane of movement of the hopper inclining upwardly and forwardly from a vertical plane generally radially of the wheel axis when the front end of the tongue is at its normal hitch elevation, and power transmission mechanism operatively connecting one of said wheels with said agitator shaft to transfer rotary movement of said one of the wheels to said shaft.

2. In a machine for applying granular material to row crops, a frame, ground engaging wheels journalled to the lower end portion of the frame on a common axis, said frame including a pair of parallel members defining guideways and a tongue extending forwardly of said guideways, the front end of said tongue being normally disposed at the level of a tractor draw bar hitch and having a portion for connection to said hitch, an elongated hopper extending transversely of the machine, and means for mounting said hopper on said guideways for upward and downward shifting movements of said hopper in a plane parallel to the guideways and between the upper and lower end portions thereof and for releasably locking said hopper in desired set positions between the limits of said shifting movement, said guideways and the plane of movement of the hopper inclining upwardly and forwardly from a vertical plane generally radially of the wheel axis when the front end of the tongue is at its normal hitch elevation, the weight distribution of the machine under all load conditions of the hopper in its lowermost position being such that the center of gravity of the machine is forwardly of the wheel axis when said front end of the tongue is at its normal hitch elevation, said machine, under said load conditions and position of the hopper, arriving at a state of balance on the wheel axis when the hitch engaging end of the tongue is elevated through a predetermined number of degrees of angular movement about the wheel axis from its normal hitch elevation, the degree of said forward inclination of the guideways being such that the said state of balance of the machine on the wheel axis is arrived at with approximately the same number of degrees of angular movement of said front end of the tongue above its normal hitch elevation under all load conditions and positions of elevation of the hopper.

3. In a machine for applying granular material to row crops, a frame, ground engaging wheels journalled to the lower end portion of the frame on a common axis, said frame including a pair of parallel members defining guideways spaced apart for passage thereof between different rows of a row crop and a tongue extending forwardly of said guideways, the front end of said tongue being normally disposed at the level of a tractor draw bar hitch and having a portion for connection to said hitch, an elongated hopper extending transversely of the machine, and means for mounting said hopper on said guideways for upward and downward shifting movements of said hopper in a plane parallel to the guideways and between the upper and lower end portions thereof and for releasably locking said hopper in desired set positions between the limits of said shifting movement, said guideways and the plane of movement of the hopper inclining upwardly and forwardly from a vertical plane generally radially of the wheel axis when the front end of the tongue is at its normal hitch elevation, the weight distribution of the machine being such that, under all load conditions of the hopper, its center of gravity is forwardly of the wheel axis when the hopper is in its lowermost position and the said front end of its tongue is at its normal hitch engaging elevation and the machine will, with the hopper in its lowermost position, arrive at a state of balance on the axis of the wheels when the hitch engaging end of the tongue is elevated to a predetermined number of degrees of angular movement about the axis of the wheels from its normal hitch elevation, the degree of said forward inclination of the guideways being such that the said state of balance of the machine on the axis of the wheels is arrived at with approximately the same number of degrees of angular movement of said front end of the tongue above its normal hitch elevation under all load conditions and positions of elevation of the hopper.

4. In a machine for applying granular material to row crops, an inverted generally U-shaped frame comprising a pair of parallel legs and a cross bar rigidly connecting the upper ends of said legs, ground engaging wheels journalled to the lower end portions of said legs on a common axis, said legs being spaced apart for passage thereof between different rows of a row crop, a tongue rigidly anchored at one end to said frame and extending generally forwardly with respect to the normal direction of movement of the machine, the front end of said tongue being normally disposed at the level of a tractor draw bar hitch and having a portion for connection to said hitch, an elongated hopper extending transversely of the machine, and means for mounting said hopper on said legs for upward and downward shifting movement of said hopper in a plane parallel to the legs and between the upper and lower end portions of said legs and for releasably locking said hopper in desired set positions between the limits of said shifting movement, said legs and the plane of movement of the hopper inclining upwardly and forwardly from a vertical plane generally radially of the wheel axis when the front end of the tongue is at its normal hitch elevation, the weight distribution of the machine being such that, under all load conditions of the hopper, its center of gravity is forwardly of the wheel axis when the hopper is in its lowermost position and the said front end of its tongue is at its normal hitch engaging elevation and the machine will, with the hopper in its said lowermost position, arrive at a state of balance on the axis of the wheels when the hitch engaging end of the tongue is elevated through a predetermined number of degrees of angular movement about the axis of the wheels from its normal hitch position, the degree of said forward inclination of the legs being such that the said state of balance of the machine on the axis of the wheels is arrived at with approximately the same number of degrees of angular movement of said front end of the tongue above its normal hitch elevation under all load conditions and positions of elevation of the hopper.

References Cited in the file of this patent

UNITED STATES PATENTS

| | | |
|---|---|---|
| 376,784 | Rives | Jan. 24, 1888 |
| 477,119 | Hill | June 12, 1892 |
| 924,330 | Farnham | June 8, 1909 |
| 1,751,346 | Mazak | Mar. 18, 1930 |